(12) United States Patent
Baney

(10) Patent No.: US 6,993,051 B2
(45) Date of Patent: Jan. 31, 2006

(54) EXTERNAL CAVITY TUNABLE LASER WITH PROVISIONS FOR INTRACAVITY OPTICAL REFLECTION SUPPRESSION

(75) Inventor: Douglas M. Baney, Los Altos, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 217 days.

(21) Appl. No.: 10/639,571

(22) Filed: Aug. 12, 2003

(65) Prior Publication Data

US 2005/0036534 A1    Feb. 17, 2005

(51) Int. Cl.
*H01S 3/10* (2006.01)
(52) U.S. Cl. .......................................... 372/27; 372/20
(58) Field of Classification Search .................. 372/27
See application file for complete search history.

(56) References Cited

U.S. PATENT DOCUMENTS

| | | | |
|---|---|---|---|
| 5,450,427 A | * | 9/1995 | Fermann et al. ............... 372/10 |
| 5,949,801 A | | 9/1999 | Tayebati |
| 6,301,274 B1 | | 10/2001 | Tayebati et al. |
| 6,339,603 B1 | | 1/2002 | Flanders et al. |
| 6,459,844 B1 | | 10/2002 | Pan |
| 6,463,085 B1 | | 10/2002 | Tayebati |
| 6,526,071 B1 | | 2/2003 | Zorabedian et al. |
| 6,560,249 B1 | | 5/2003 | Lefevre et al. |

* cited by examiner

*Primary Examiner*—James Vannucci

(57) ABSTRACT

An external cavity laser system includes an in-line optical filter and a reflection suppressor that efficiently suppresses back-reflected light while allowing light to resonate within the laser cavity. The reflection suppressor may include a polarizer that polarizes light within the cavity and polarization rotators that rotate the polarization state of the polarized light such that back-reflected light is suppressed by the polarizer. Because back-reflected light is suppressed, use of an in-line filter becomes viable in an external cavity laser system.

16 Claims, 4 Drawing Sheets

US 6,993,051 B2

EXTERNAL CAVITY TUNABLE LASER WITH PROVISIONS FOR INTRACAVITY OPTICAL REFLECTION SUPPRESSION

FIELD OF THE INVENTION

The present invention relates generally to lasers, and more particularly to optical reflection suppression in a laser cavity.

BACKGROUND OF THE INVENTION

Optical technology is a vital part of modern telecommunications systems. The optical technology toolset includes lightwave sources, such as lasers. A laser typically requires a gain media and appropriate electromagnetic cavity to operate. A simple laser includes two partially reflective mirrors. Partially reflective mirrors reflect some light, but allow some light through as well. One of the mirrors of a laser cavity could be completely reflective. Together, the gain media and mirrors form what is known as a laser cavity. The laser cavity is designed to have an optical loss lower than the optical gain of the gain media as well as appropriate spectral response to encourage oscillation at a desired wavelength.

Techniques for tuning lasers to adjust the wavelength have been developed. The techniques include using diffraction gratings and in-line filters. A diffraction grating is mechanically adjusted to selectively reflect light of a given wavelength band in the laser cavity. Diffraction gratings provide a broad tuning range without introducing excessive amounts of back-reflected light that is outside of the desired wavelength band. Back-reflected light is undesirable because stray reflections can interfere with the desired feedback obtained from filtered light. One drawback to the use of diffraction gratings in external cavity lasers is that diffraction gratings are relatively bulky. On the other hand, in-line filters, such as in-line Fabry-Perot filters, are compact structures although they typically cause excessive amounts of back-reflected light within a laser cavity.

SUMMARY OF THE INVENTION

In accordance with the invention, an external cavity laser system includes an in-line optical filter and a reflection suppressor that efficiently suppresses back-reflected light while allowing light to resonate within the laser cavity. The reflection suppressor may include a polarizer that polarizes light within the cavity and polarization rotators that rotate the polarization state of the polarized light such that back-reflected light is suppressed by the polarizer. Because back-reflected light is suppressed, use of an in-line filter becomes viable. A compact in-line filter, such as a Fabry-Perot filter, can then be incorporated into an external cavity laser instead of a relatively bulky diffraction grating.

BRIEF DESCRIPTION OF THE DRAWINGS

Throughout the description, similar reference numbers may be used to identify similar elements.

DETAILED DESCRIPTION OF THE INVENTION

Figure 1:
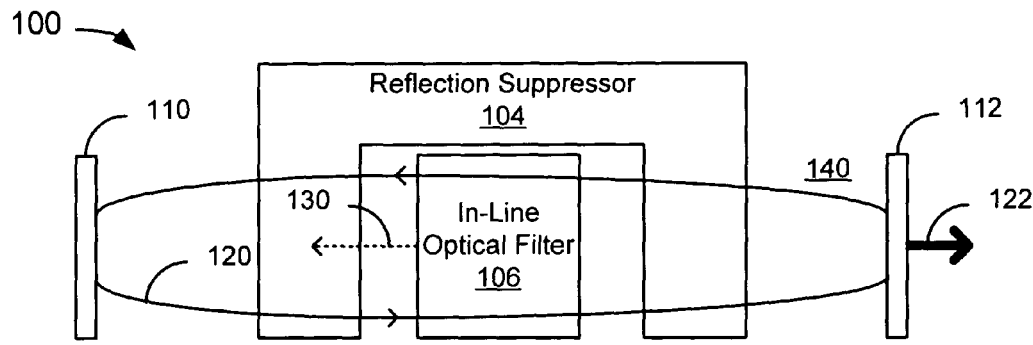
FIG. 1 is a block diagram of an embodiment of an external cavity laser system in accordance with the invention.

As shown in the drawings for the purposes of illustration, the invention involves suppressing reflected light in an external cavity laser. The suppressed light is preferentially of a frequency that is different from the desired operating frequency of the laser. A notable embodiment of the invention is the method taught to suppress stray cavity reflections that occur when a laser cavity includes an in-line optical filter and light is back-reflected off of the in-line optical filter.

FIG. 1 is a block diagram of an embodiment of an external cavity laser system 100 in accordance with the invention. FIG. 1 is intended to illustrate how the system 100 suppresses back-reflected light in a laser cavity while allowing light to resonate within the laser cavity. The system 100 includes a reflection suppressor 104, an in-line optical filter 106, a first mirror 110, and a second mirror 112.

The reflection suppressor 104 suppresses back-reflected light while allowing other light to pass through it. The reflection suppressor 104 may have a number of different configurations. For example, the reflection suppressor 104 may include one or more polarizers and multiple polarization rotators. The polarization rotators may include ¼ plate rotators, ½ plate rotators, Faraday rotators, or other polarization rotators. One or more of the polarization rotators may be unidirectional. The polarizers and polarization rotators are placed such that back-reflected light passes through a number of polarization rotators such that the polarization state of the back-reflected light is orthogonal to a polarizer that is used to polarize the light. At the same time, light of a desired frequency should have a polarization state that is rotated such that the polarization state of the light is parallel to the polarizer.

The in-line optical filter 106 filters out light that is not of a desired frequency, thereby causing the light to resonate at the desired frequency. Any of a number of in-line filter devices can be used. Since the output of a laser cavity is typically of a narrow frequency band, a high-resolution filter is preferred. The in-line optical filter 106 may be tunable so that the optical operating frequency (i.e., the frequency of light that the in-line optical filter 106 does not filter out) can be adjusted. Example in-line filters include Fabry-Perot (FP) filters, FP interferometers, optical resonators, and other devices that accept light as input, filter the light, and provide filtered light of a desired frequency band as output. Optical resonators include devices that efficiently transmit light that is incident on the device when the light satisfies a resonance condition. The resonance condition is typically that of a standing wave in a cavity of the optical resonator. When in-line optical filters, including optical resonators, are used, the system 100 is typically more compact than when out-of-line spectral purifiers are used. An example of a type of in-line filter that is suitable for this invention is a free-space MEMs Fabry-Perot filter such as those produced by Axsun Technologies or Nortel Networks.

The first mirror 110 may be partially reflective or completely reflective. The second mirror 112 is partially reflective and light output from the system 100 is represented in FIG. 1 as a thick arrow 122 from the second mirror 112. The first mirror 110 and second mirror 112 together define a laser cavity 140. The laser cavity has an associated gain medium (not shown). Light resonating within the laser cavity 140 is represented as an elliptical loop 120. Since the in-line optical filter 106 filters the light resonating within the laser cavity 140, the elliptical loop 120 is hereinafter referred to as filtered light 120. Light that is back-reflected from the in-line optical filter 106 is represented as a dashed arrow 130 (hereinafter referred to as back-reflected light 130).

The system 100 operates to suppress the back-reflected light 130 while allowing filtered light to resonate within the laser cavity 140. Light is introduced into the laser cavity 140 from a light source (not shown). The light source may be an external source or an internal source, such as a semiconductor optical amplifier. Light that is introduced into the laser cavity 140 passes through the reflection suppressor 104 to the in-line optical filter 106. The in-line optical filter 106 filters the light into filtered light 120. A portion of the light may be back-reflected and is referred to herein as back-reflected light 130. The back-reflected light 130 is reflected into the reflection suppressor 104 where it is suppressed. Filtered light 120, on the other hand, passes through the reflection suppressor 104 on the other side of the in-line optical filter 106, and is reflected by the second mirror 112. Then the filtered light 120 passes back through the reflection suppressor 104, but is not suppressed. In an embodiment, the reflection suppressor 104 achieves this functionality by ensuring that the filtered light 120 has the proper polarization state while the back-reflected light 130 does not. An exemplary reflection suppressor is described with reference to FIG. 2A. The description serves to clarify this functionality by way of example.

Figure 2A:
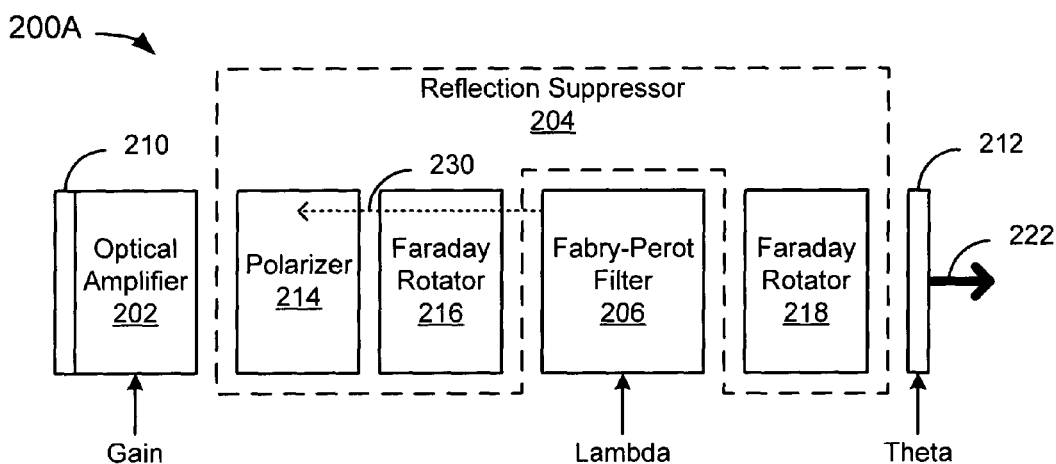
FIGS. 2A and 2B are block diagrams of an embodiment of an external cavity tunable laser system in accordance with the invention.

FIG. 2A is a block diagram of an embodiment of an external cavity tunable laser system 200 in accordance with the invention. FIG. 2A is a specific embodiment of the system 100 (FIG. 1). The system 200 includes an optical amplifier 202, a reflection suppressor 204, a FP filter 206, a fixed mirror 210, and a theta mirror 212. The reflection suppressor 204 includes a polarizer 214, a first Faraday rotator 216, and a second Faraday rotator 218. Inputs to the system 200 include a gain input to the optical amplifier 202, lambda input to the FP filter 206, and theta input to the theta mirror 212. An output of the system 200 is light output 222. Back-reflected light 230 is represented as a dashed line 230. In FIG. 2A, an elliptical loop representing filtered light, such as the filtered light 120 (FIG. 1), has been omitted to avoid cluttering the diagram.

The optical amplifier 202 is an exemplary source for providing light to the laser cavity. In an embodiment, the optical amplifier 202 is a semiconductor optical amplifier (SOA) that has two or more facets. One facet of the SOA is the first mirror 210 and another facet of the SOA (facing the reflection suppressor 204) is anti-reflection-coated. The output power of the system 200 is dependent in part on the amount of gain input to the optical amplifier 202. In an embodiment, the gain input is an electrical injection current. The optical amplifier 202 provides an optical gain at approximately 1.55 microns that is regulated by the electrical injection current from the gain input. In the embodiment of FIG. 2A, the optical amplifier 202 light output is directed toward the reflection suppressor 204.

The polarizer 214 polarizes light from the optical amplifier 202. In an embodiment, the transmission axis of the polarizer 214 is aligned to the preferred polarization axis of the optical amplifier, i.e. the polarization that exhibits the most gain in the optical amplifier.

The Faraday rotator 216 receives the polarized light from the polarizer 214 and rotates the polarization state of the polarized light by 45 degrees. The light then passes out of the reflection suppressor 204 to the FP filter 206.

The FP filter 206 filters out light that is not of a desired frequency. In an embodiment, the FP filter 206 is a microelectromechanical (MEM) device. The passband frequency or wavelength of this device can be tuned by application of a voltage to its electrical terminals. The FP filter 206 provides for sidemode reductions via its filter function, which is relatively narrow with MEMs FP filters—as low as approximately 1 GHz. This can provide superior sidemode suppression levels as compared to compact external cavity lasers employing bulk-optic diffraction gratings as cavity filtering elements.

The desired frequency (e.g., the center frequency of the FP filter 206) is set using a lambda input to the FP filter 206. In other words, the FP filter 206 is tunable to establish an optical operating frequency for the system 200. (It should be noted that the selection of operating frequency may be made by a combination of the setting of the theta mirror 212 and the FP filter 206 as described later with reference to the theta mirror 212.) Light having the filter center frequency is preferentially passed through the FP filter 206. However, a portion of the incident light is back-reflected. The back-reflected light 230 tends to be of an undesired frequency and can interfere with desired feedback obtained from the filtered light. The back-reflected light 230 reflects back into the reflection suppressor 204.

The Faraday rotator 216 rotates the polarization state of the back-reflected light 230. The Faraday rotator 216 is a unidirectional polarization rotator. In other words, the polarization state of light that passes through the Faraday rotator 216 is rotated in the same direction each time irrespective of whether the light enters the Faraday rotator 216 through a first side or a second side. Accordingly, at this point, the back-reflected light 230 has a polarization state that is 90 degrees away from the alignment of the polarizer 214. Since the back-reflected light 230 is orthogonal to the transmission axis of the polarizer 214, when the back-reflected light 230 reaches the polarizer 214, the back-reflected light 230 is suppressed.

Filtered light that passes through the FP filter 206 reaches the Faraday rotator 218 on the other side of the FP filter 206, where the polarization state of the filtered light is rotated another 45 degrees, and passes out of the reflection suppressor 204 to reach the theta mirror 212.

The theta mirror 212 is a partially reflective mirror through which light passes as light output 222. An advantage of making the theta mirror 212 partially reflective is that spontaneous emissions from the optical amplifier 202 can be filtered by way of the in-line filter 206. This results in a cleaner source of light, albeit at possibly lower light power, than could be obtained by using the fixed mirror 210 output without an intervening in-line filter.

Figure 2B:
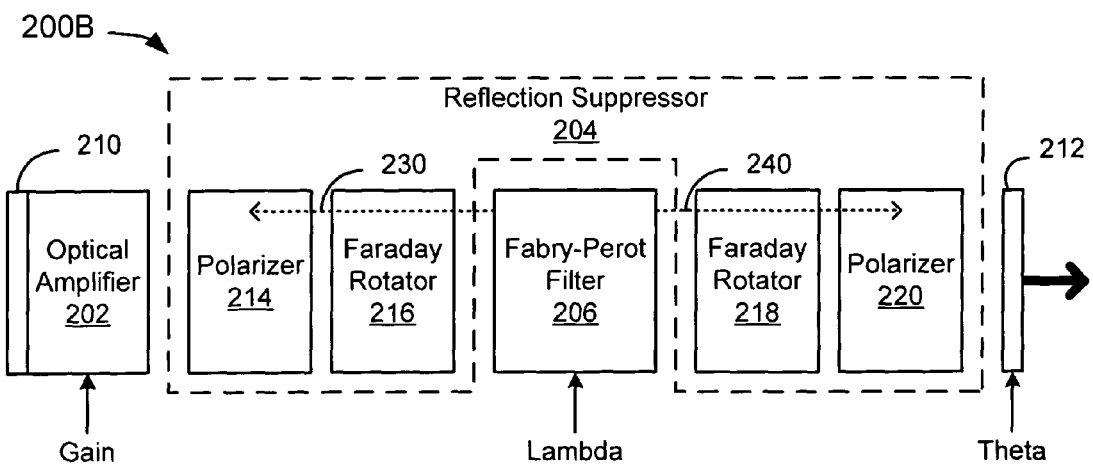

If reflection from the second surface of the FP filter 206 causes unintended optical interaction with desired reflection from mirror 212, a polarizer 220 may be incorporated into the reflection suppressor 204, between the rotator 218 and the mirror 212, as illustrated in FIG. 2B. In this case, the polarizer 220 should have a transmission axis orthogonal to the transmission axis of the polarizer 214. Much like the polarizer 214 suppresses back-reflected light 230 that is reflected off of the in-line filter 206 in a first direction, the polarizer 220 suppresses back-reflected light 240 that is reflected off of the in-line filter 206 in a second direction. In both cases, the orientation of the polarizers 214 and 220 can be finely tuned to account for small errors in the Faraday rotators 216 and 218 to maximize suppression of undesired reflection.

In the system 200, the theta mirror 212 is also an adjustable mirror having a theta input and an associated mechanical mover for actuating the theta mirror 212. In an alternative, the mechanical mover for actuating the theta mirror 212 is a MEMs digital stepper motor. The mechanical mover adjusts the theta mirror according to theta input to control the laser cavity phase. Accordingly, by providing the appropriate theta input, the system 200 is tunable.

When the system 200 serves as a mode-hopping laser, two controls are available, the optical amplifier 202 gain through the injection current and the FP filter 206 filter center frequency. For continuous tuning, the mechanical movers associated with the theta mirror 212 translate the theta mirror 212 to keep a cavity fringe number constant. The fringe number, also known as the mode number ($N_0$) can be estimated by the cavity dimensions as illustrated for a cavity length ($L_0$) of 3.4 mm and a laser operating at a wavelength, or frequency ($\lambda_0$), of 1.5 microns. Note that we assume an index of refraction of unity. Actual index of refraction will vary according to the actual materials and lengths of the components that make up the laser cavity.

$$N_0 = L_0/\lambda_0 = 2300$$

To achieve continuous tuning, the cavity length ($L_0$) must be stretched or shrunk to maintain the mode number ($N_0$) as the laser frequency ($\lambda_0$) decreases or increases. To accomplish this the following condition applies:

$$\frac{L_o + \Delta L}{\lambda_o + \Delta \lambda} = N_o$$

or $$L_o + \Delta L = N_o \lambda_o + \Delta \lambda N_o$$

resulting in $$\Delta L = \Delta \lambda N_o$$

For a 200 nm tuning range, the mirror would need to translate approximately:

$$\Delta L = 0.2 \times 2300 = 460 \ \mu m$$

Figure 3:
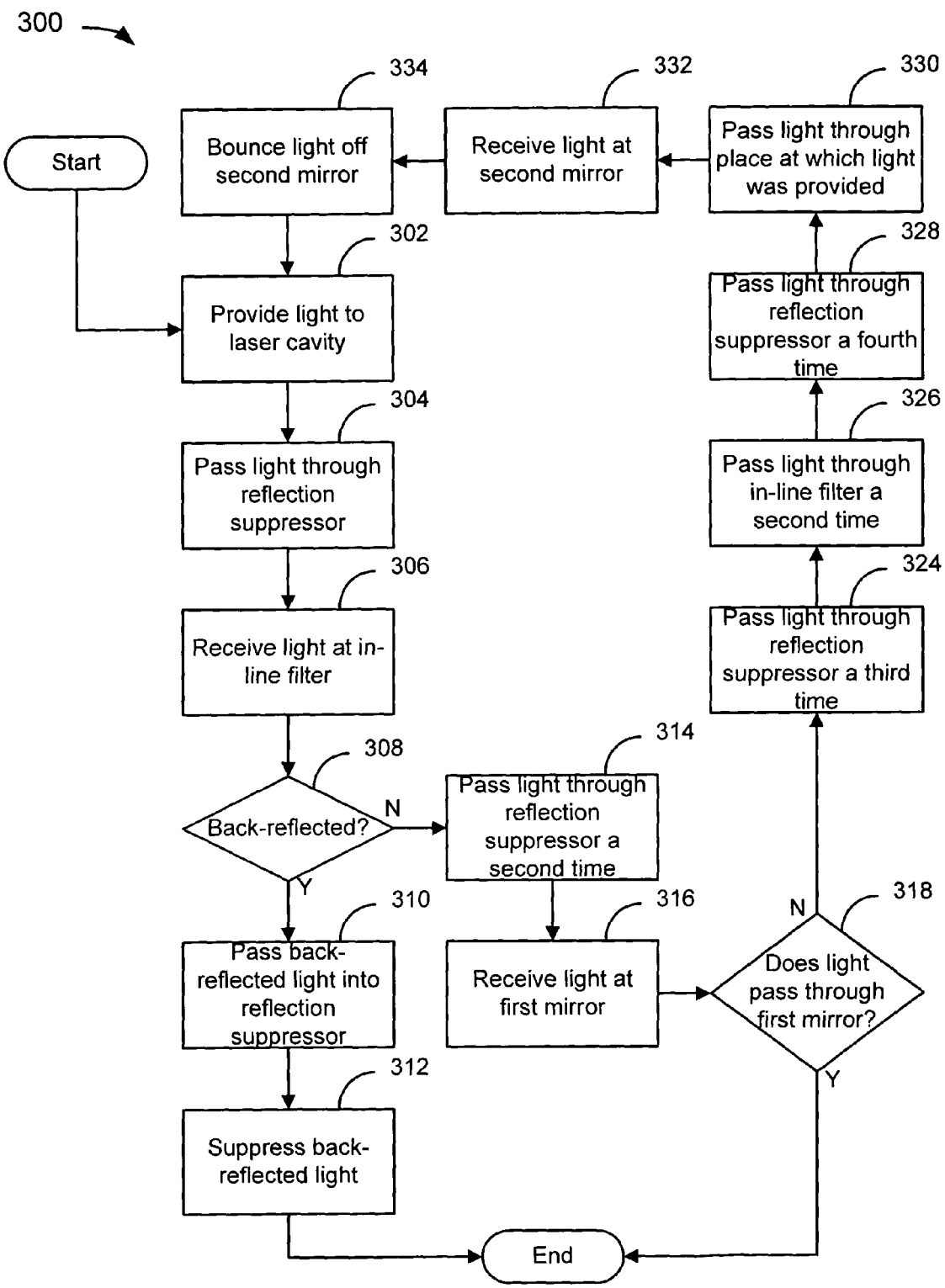
FIG. 3 is a flowchart illustrating an exemplary light path within an external cavity laser in accordance with the invention.

FIG. 3 is a flowchart 300 that describes an exemplary light path within an external cavity laser in accordance with the invention. The light path is a round trip from the place where light is provided to the laser cavity and back again. When the light is output or back-reflected and suppressed, the flowchart 300 ends.

The flowchart 300 starts with providing light to a laser cavity at step 302, passing light through a reflection suppressor at step 304, and receiving light at an in-line filter 306. In an embodiment, at step 304, the light is polarized and then the polarization state of the polarized light is rotated 45°. At decision point 308, it is determined whether the light is back-reflected off of the in-line filter. If so (308-Y), the back-reflected light passes into the reflection suppressor at step 310, the back-reflected light is suppressed at step 312, and the flowchart 300 ends. In an embodiment, at step 310, the polarization state of the back-reflected light is rotated 45° and, at step 312, the back-reflected light is suppressed because of its polarization state.

If the light is not back-reflected (308-N), the flowchart 300 continues with passing light through the reflection suppressor a second time at step 314 and receiving light at a first mirror at step 316. In an embodiment, at step 314, the polarization state of the light is rotated 45°. At decision point 318, if the light passes through the first mirror, then the light becomes laser output and the flowchart 300 ends. If the light bounces off of the first mirror, then the light passes through the reflection suppressor a third time at step 324. The light passes through the in-line filter a second time at step 326. The light passes through the reflection suppressor a fourth time at step 328. The light passes through the place at which the light was provided at step 330. The light is received at a second mirror at step 332 and then bounces off of the second mirror at step 334, at which point the light has completed a round-trip from the place at which it was provided to the laser cavity. In an embodiment, at step 324, the polarization state of the light is rotated 45° and, at step 328, the polarization state of the light is rotated another 45° and the light is polarized. In this embodiment, the light is not suppressed at step 328 because the polarization state of the light allows the light to pass through a polarizer. Then, the flowchart 300 continues at step 302.

Figure 4A:
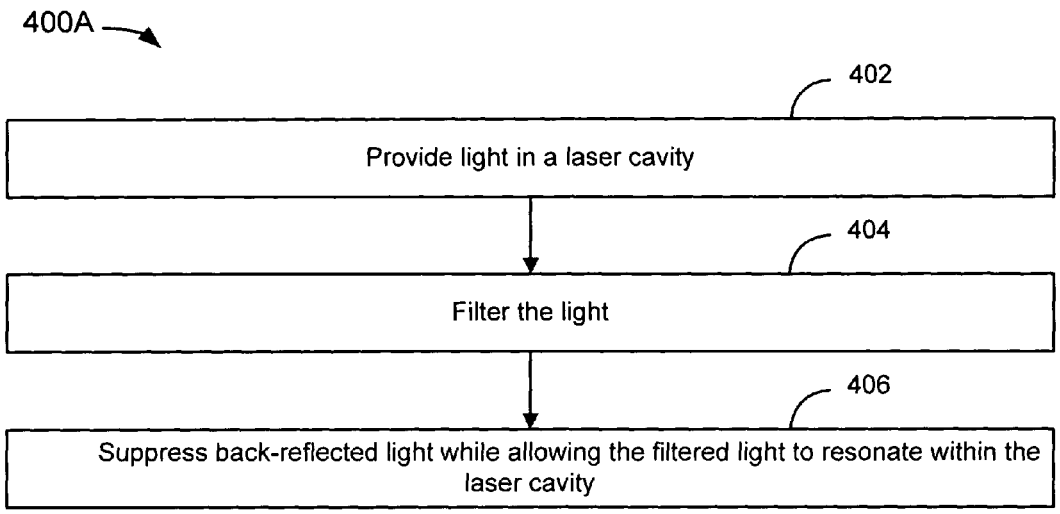
FIGS. 4A, 4B, and 4C are flowcharts of a method for intracavity optical reflection suppression in accordance with the invention.
Figure 4B:
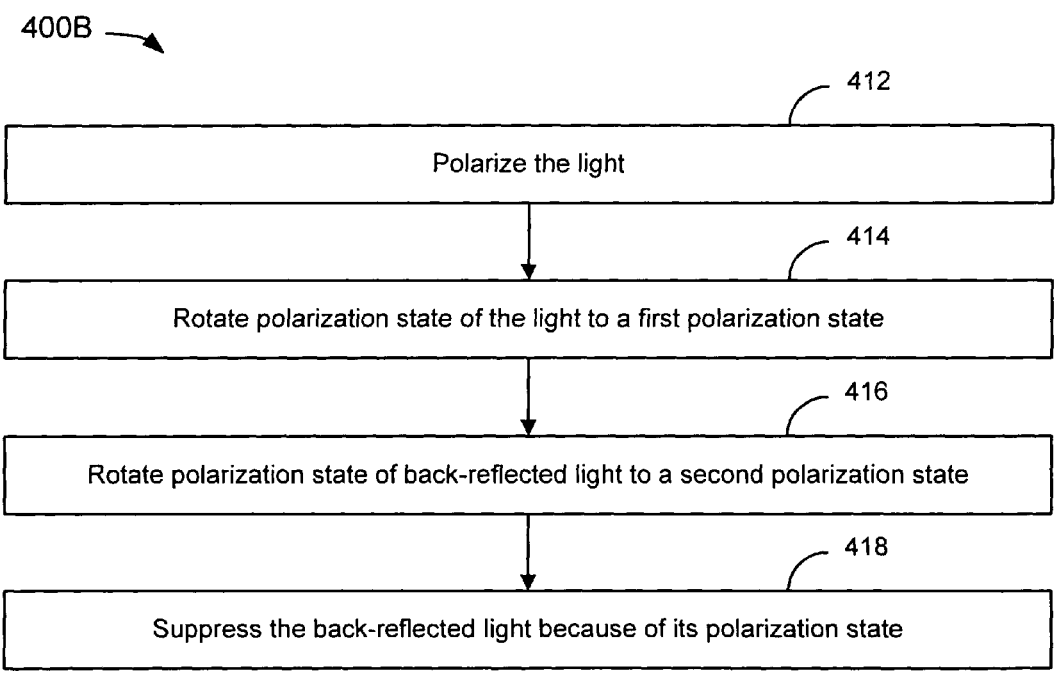
Figure 4C:
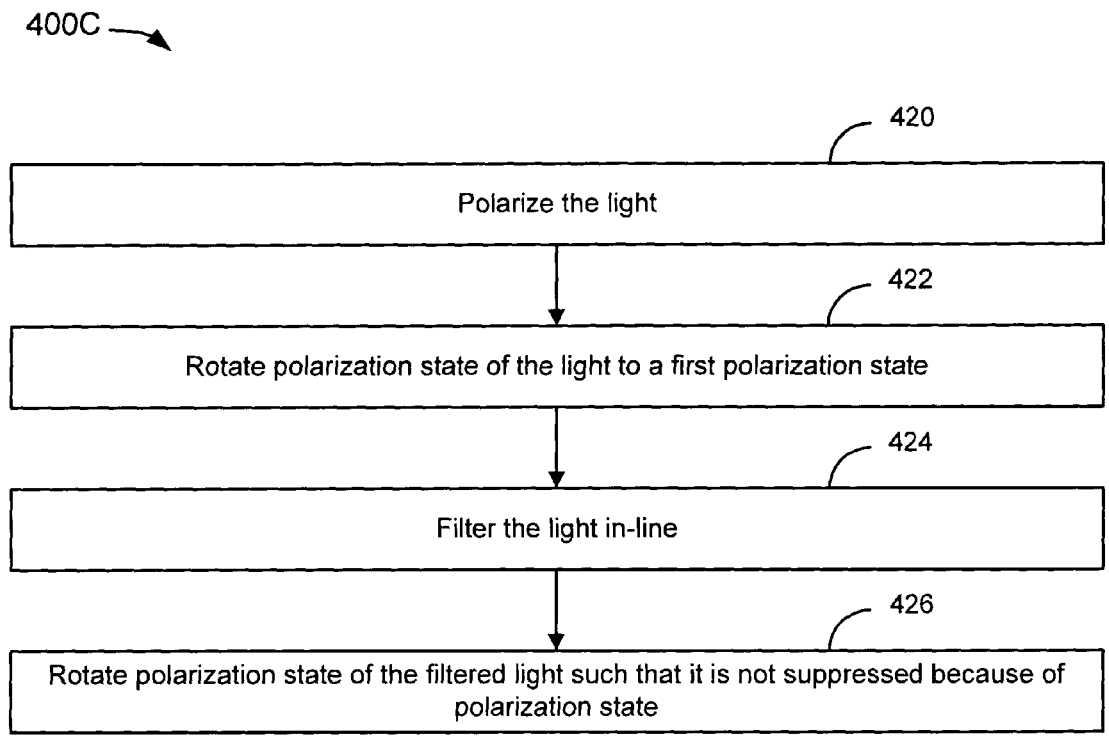

FIGS. 4A, 4B, and 4C are flowcharts of an exemplary method for intracavity optical reflection suppression in accordance with the invention. FIG. 4A illustrates a flowchart 400A of a method for passing light through a laser cavity. The flowchart 400A includes providing light in a laser cavity at step 402, filtering the light at step 404, and suppressing back-reflected light while allowing the filtered light to resonate within the laser cavity at step 406. FIG. 4B illustrates a flowchart 400B of an exemplary method for suppressing back-reflected light at step 406. FIG. 4C illustrates a flowchart 400C of an exemplary method for avoiding suppression of filtered light at step 406.

The flowchart 400B starts with polarizing the light at step 412, rotating polarization state of the light to a first polarization state at step 414, rotating polarization state of back-reflected light to a second polarization state at step 416, and suppressing the back-reflected light because of its polarization state at step 418. In an embodiment, at step 418, a polarizer suppresses the back-reflected light because the second polarization state is orthogonal to the alignment of the polarizer.

The flowchart 400C starts with polarizing the light at step 420, rotating polarization state of the light to a first polarization state at step 422, filtering the light in-line at step 424, and rotating polarization state of the filtered light such that it is not suppressed because of polarization state at step 426. In an embodiment, at step 426, the polarization state of the light is rotated until the polarization state of the light is parallel to the alignment of a polarizer. The polarizer allows the filtered light to pass because the polarization state of the filtered light is parallel to the alignment of the polarizer.

Thus, FIGS. 4A, 4B, and 4C illustrate an exemplary method for suppressing back-reflected light while allowing filtered light to resonate within a laser cavity. It shall be appreciated that not all methods steps described must be performed, nor must they be performed in the order stated.

The term laser cavity is defined broadly to include a laser cavity comprising two mirrors and a gain medium. The term laser cavity may also include a gain medium and other components that serve to output a coherent beam of light. A theta mirror (one of the mirrors in some laser cavities) is broadly defined to include mechanically adjustable mirrors, mirrors affixed to mechanically adjustable matter, or any other mirrors that are mechanically or otherwise adjustable according to a theta input. One or more mirrors of a laser cavity may be partially reflective mirrors.

The term optical source is defined broadly to include an optical amplifier, a repeater, an optical source, an optical fiber, a light-emitting diode, or any other or any combination of the listed or other devices capable of transmitting, amplifying, generating, or otherwise providing light.

The term reflection suppressor is broadly defined to include any device or combination of devices that serve to suppress light that has been back-reflected off of an in-line optical filter while allowing light that has not been back-reflected to resonate within the chamber. An example of a combination of devices is a polarizer and any combination of polarization rotators that together rotate the polarization state of light by a multiple of 180° from the time the light passes through the polarizer until the light passes through the polarizer again. Back-reflected light would not pass through all of the polarization rotators so the polarization state of the back-reflected light would be a value that is not a multiple of 180° from the time the light passes through the polarizer until the back-reflected light passes through the polarizer. The term back-reflected light, as used herein, refers to light that is reflected from an in-line filter as opposed to light that is reflected from the mirrors of the laser cavity.

Although specific embodiments of the invention have been described and illustrated, the invention is not to be limited to the specific forms or arrangements of parts as described and illustrated herein. The invention is limited only by the claims.

What is claimed is:

1. An external cavity laser system, comprising:
   a laser cavity;
   a light source that provides light to said laser cavity;
   an in-line optical filter, within said laser cavity, which filters said light within said laser cavity; and
   a reflection suppressor, within said laser cavity, which suppresses back-reflected light within said laser cavity while allowing light to resonate within said laser cavity;
   wherein said reflection suppressor includes:
      a polarizer, within said laser cavity, which polarizes the light within said laser cavity; and
      polarization rotators, within said laser cavity, which rotate the polarization state of the light such that said polarizer suppresses back-reflected light;
   wherein said polarizer is a first polarizer for suppressing back-reflected light in a first direction from said in-line optical filter, and further including:
   a second polarizer for suppressing light back-reflected in a second direction from said in-line optical filter.

2. The system of claim 1, wherein said in-line optical filter is tunable to establish an optical frequency for the system.

3. The system of claim 1, wherein said in-line optical filter is a micro-electromechanical (MEM) filter.

4. The system of claim 1, wherein said in-line optical filter is a Fabry-Perot filter.

5. The system of claim 1, wherein said polarization rotators include multiple unidirectional polarization rotators.

6. The system of claim 1, wherein said polarization rotators include:
   a first polarization rotator that rotates the polarization state of light incident on the first polarization rotator by 45 degrees, wherein light that passes through the polarizer, that is rotated by the first polarization rotator, and that is back-reflected, is rotated again by the first polarization rotator and suppressed by the polarizer.

7. The system of claim 6, wherein said polarization rotators include:
   a second polarization rotator that rotates the polarization state of light incident on the second polarization rotator by 45 degrees, wherein light passes through the polarizer, is rotated by the first polarization rotator, is not back-reflected, is rotated by the second polarization rotator, is reflected by a first mirror of the laser cavity back to the second polarizer and the second polarization rotator, is rotated by the second polarization rotator, is rotated by the first polarization rotator, passes through the first polarizer, and is reflected by a second mirror of the laser cavity, thereby completing a laser cavity round trip.

8. The system of claim 1, wherein said laser cavity includes:
   a fixed mirror; and
   a theta mirror opposite said fixed mirror such that said light source and said reflection suppressor are between said fixed mirror and said theta mirror, wherein laser output is through said theta mirror.

9. The system of claim 8, wherein the laser output power and frequency are established by settings of said light source, said in-line optical filter, and said theta mirror.

10. The system of claim 1 wherein the first polarizer and the second polarizer have transmission axes that are orthogonal to each other.

11. A method for operating an external cavity laser, comprising:
   providing light in a laser cavity;
   polarizing the light to an initial polarization state;
   rotating the polarizatton state of the light to a first polarization state;
   filtering the light in-line;
   rotating the polarization state of back-reflected light to a second polarization state;
   polarizing the back-reflected light such that the back-reflected light is suppressed,
   rotating the polarization state of the filtered light to a second polarization state;
   polarizing the filtered light after the polarization state is rotated to the second polarization state;
   reflecting the filtered light off of the laser cavity;
   polarizing the filtered light after the light is reflected off of the laser cavity;
   rotating the polarizatton state of the filtered light to a third polarization state;
   filtering the in-line again;
   rotating the polarization state of the filtered light to a fourth polarization state, wherein the fourth plarization state is parallel to the initial polarization state; and
   polarizing the filtered light after the polarization state is rotated to the forth polarization state.

12. An external cavity tunable laser system, comprising:
   a laser cavity including a first mirror and a second mirror;
   an in-line optical filter, within said laser cavity, for filtering light to set an optical frequency for the system;
   an optical amplifier, between said first mirror and said in-line optical filter, which provides light to said in-line optical filter;
   a first polarizer, between said in-line optical filter and said optical amplifier, for polarizing light with said laser cavity;
   a first polarization rotator, between said in-line optical filter and said first polarizer, for rotating the polarization state light;
   a second polarization rotator, between said in-line optical filter and said second mirror, for rotating the polarization state of light;
   a second polarizer, between said second polarization rotator and said second mirror for polarizing light within said laser cavity;

wherein back-reflected light is suppressed by the first and second polarizers.

13. The system of claim 12, wherein said in-line optical filter is a Fabry-Perot filter.

14. The system of claim 12, wherein said first polarization rotator and said second polarization rotator are Faraday rotators that rotate the polarization state of light by 45 degrees.

15. The system of claim 12, wherein said first and second polarizers are aligned to a high gain axis of said optical amplifier.

16. The system of claim 12 wherein the first polarizer and the second polarizer have transmission axes that are orthogonal to each other.

* * * * *

UNITED STATES PATENT AND TRADEMARK OFFICE
CERTIFICATE OF CORRECTION

PATENT NO. : 6,993,051 B2  Page 1 of 1
APPLICATION NO. : 10/639571
DATED : January 31, 2006
INVENTOR(S) : Baney It is certified that error appears in the above-identified patent and that said Letters Patent is hereby corrected as shown below:

On the Title Page Item (56) under "U.S. Patent Documents", line 2, after "Tayebati" insert -- 372/20 --.

On the Title Page Item (56) under "U.S. Patent Documents", line 4, after "Flanders et al." insert -- 372/20 --

In column 8, line 24, in Claim 11, delete "polarizatton" and insert -- polarization --, therefor.

In column 8, line 40, in Claim 11, delete "polarizatian" and insert -- polarization --, therefor.

In column 8, line 42, in Claim 11, after "the" insert -- light --.

In column 8, line 44, in Claim 11, delete "plarization" and insert -- polarization --, therefor.

In column 8, line 61, in Claim 12, after "state" insert -- of --.

In column 8, line 64, in Claim 12, after "light" delete ";" and insert -- , --, therefor.

In column 8, line 66, in Claim 12, after "mirror" insert -- , --.

Signed and Sealed this

Twenty-ninth Day of January, 2008

JON W. DUDAS
*Director of the United States Patent and Trademark Office*

UNITED STATES PATENT AND TRADEMARK OFFICE
CERTIFICATE OF CORRECTION

PATENT NO. : 6,993,051 B2  Page 1 of 1
APPLICATION NO. : 10/639571
DATED : January 31, 2006
INVENTOR(S) : Baney It is certified that error appears in the above-identified patent and that said Letters Patent is hereby corrected as shown below:

On the Title Page, Item (56), in field (56), under "U.S. Patent Documents", in column 2, line 2, after "Tayebati" insert -- 372/20 --.

On the Title Page, Item (56), in field (56), under "U.S. Patent Documents", in column 2, line 4, after "Flanders et al." insert -- 372/20 --.

In column 8, line 24, in Claim 11, delete "polarizatton" and insert -- polarization --, therefor.

In column 8, line 40, in Claim 11, delete "polarizatian" and insert -- polarization --, therefor.

In column 8, line 42, in Claim 11, after "the" insert -- light --.

In column 8, line 44, in Claim 11, delete "plarization" and insert -- polarization --, therefor.

In column 8, line 61, in Claim 12, after "state" insert -- of --.

In column 8, line 64, in Claim 12, after "light" delete ";" and insert -- , --, therefor.

In column 8, line 66, in Claim 12, after "mirror" insert -- , --.

Signed and Sealed this

Fifth Day of February, 2008

JON W. DUDAS
*Director of the United States Patent and Trademark Office*